United States Patent
Catraye

(10) Patent No.: US 12,354,175 B1
(45) Date of Patent: Jul. 8, 2025

(54) ACCREDITATION TRACKING AND TRANSLATION SYSTEM AND PROCESSES FOR TRACKING AND TRANSLATING EDUCATIONAL, PROFESSIONAL, AND CAREER-BASED ACCREDITATION

(71) Applicant: Cephas Mondoukpe Gloria Catraye, Omaha, NE (US)

(72) Inventor: Cephas Mondoukpe Gloria Catraye, Omaha, NE (US)

( * ) Notice: Subject to any disclaimer, the term of this patent is extended or adjusted under 35 U.S.C. 154(b) by 0 days.

(21) Appl. No.: 18/611,344

(22) Filed: Mar. 20, 2024

(51) Int. Cl.
G06F 40/58 (2020.01)
G06Q 50/20 (2012.01)

(52) U.S. Cl.
CPC ............. *G06Q 50/20* (2013.01); *G06F 40/58* (2020.01)

(58) Field of Classification Search
CPC .. G06F 16/1837; G06F 16/27; G06F 16/9535; G06F 21/31; G06F 16/215; G06F 16/2365; G06F 16/2462; G06F 16/3334; G06F 16/3335; G06F 16/3346; G06F 16/335; G06F 16/90328; G06F 16/90344; G06F 3/04895; G06F 40/289; G06F 40/30; G06F 21/6245; G06F 16/9035; G06F 16/951; G06F 16/9538; G06F 30/10; G06F 40/58; G06Q 10/105; G06Q 20/10; G06Q 20/367; G06Q 50/01
See application file for complete search history.

(56) References Cited

U.S. PATENT DOCUMENTS

| | | | | |
|---|---|---|---|---|
| 8,527,773 B1 * | 9/2013 | Metzger | ................ | G06F 21/313 713/168 |
| 9,369,287 B1 * | 6/2016 | Sarvestani | ............... | G07D 7/01 |
| 10,887,113 B2 * | 1/2021 | Queralt | .................... | G06F 21/31 |
| 11,550,832 B2 * | 1/2023 | Verma | ................. | G06F 16/3346 |
| 11,803,665 B2 * | 10/2023 | Kinsel | ..................... | G06F 21/64 |
| 2002/0083019 A1 * | 6/2002 | Bystrak | .................. | G06Q 30/02 705/401 |
| 2008/0028220 A1 * | 1/2008 | Wyssen | ................. | G06F 21/645 713/176 |
| 2017/0352039 A1 * | 12/2017 | Malkawi | ................. | G06F 40/58 |
| 2018/0097640 A1 * | 4/2018 | Queralt | ................... | G06F 21/41 |
| 2020/0403775 A1 * | 12/2020 | Huang | .................... | G06F 21/64 |
| 2021/0194703 A1 * | 6/2021 | Queralt | .............. | H04L 63/0815 |
| 2021/0398143 A1 * | 12/2021 | Park | .................... | G06F 16/9035 |
| 2023/0019862 A1 * | 1/2023 | Vines | ..................... | G06F 40/58 |
| 2023/0084684 A1 * | 3/2023 | Kartik | ................. | G06Q 30/018 705/7.18 |
| 2023/0419856 A1 * | 12/2023 | Baker | ..................... | G06F 40/58 |

* cited by examiner

*Primary Examiner* — Abdelali Serrou
(74) *Attorney, Agent, or Firm* — Plager Schack LLP; Mark H. Plager; Stephen Hallberg

(57) ABSTRACT

An accreditation tracking and translation system and software-implemented processes for tracking and translating educational, professional, and career-based accreditation is disclosed. The accreditation tracking and translation system and software-implemented processes tracks and translates educational and career-based accreditation, such as school transcripts, certificates, degrees, attestations, etc. The accreditation tracking and translation system and software-implemented processes also make the tracked and translated accreditation easily accessible through any smartphone, tablet computing device, or computer. The accreditation tracking and translation system and software-implemented processes also keeps all data records secure, trusted, and easily accessible, including the original data and the tracked and translated accreditation.

16 Claims, 4 Drawing Sheets

ACCREDITATION TRACKING AND TRANSLATION SYSTEM AND PROCESSES FOR TRACKING AND TRANSLATING EDUCATIONAL, PROFESSIONAL, AND CAREER-BASED ACCREDITATION

BACKGROUND

Embodiments of the invention described in this specification relate generally to accreditation systems, and more particularly, to accreditation tracking and translation system and processes for tracking and translating educational, professional, and career-based accreditation.

With the ever-growing number of international students and workers around the world, many people experience numerous difficulties finding and proving the authenticity of their educational and career-based accreditation. This, in many cases, results in the loss of considerable amounts of acquired school credits or the rejection of foreign accreditation (within most countries easily translate into multiple years of school or training).

Systems in the past, as well as several existing systems currently, are limited to keeping these records within the institutions where they were first accredited. This makes them very hard to access in other countries. The problem is compounded by a language barrier. For example, in the United States it usually takes months to access school transcripts and career-based accreditation.

Therefore, what is needed is a way to track and translate educational and career-based accreditation (e.g., school transcripts, certificates, degrees, attestations, and other forms of official recognition), provide a universal interface that enables seamless user access to their own educational and career-based accreditation via smartphone, tablet computing device, or computer, and securely store all records in a trusted, safe, and easily accessible manner.

BRIEF DESCRIPTION

A novel accreditation tracking and translation system and accreditation tracking and translation processes are disclosed for tracking and translating educational, professional, and career-based accreditation. In some embodiments, the accreditation tracking and translation system and processes track and translate educational and career-based accreditation, such as school transcripts, certificates, degrees, attestations, etc. In some embodiments, the accreditation tracking and translation system and processes also make the tracked and translated accreditation easily accessible through any smartphone, tablet computing device, or computer. In some embodiments, the accreditation tracking and translation system and processes also keep all data records secure, trusted, and easily accessible, including the original data and the tracked and translated accreditation.

In some embodiments, the accreditation tracking and translation processes comprises an applicant-initiated accreditation request process for verifying accreditation of an applicant applying for a position with a company. In some embodiments, the applicant-initiated accreditation request process comprises (i) interacting, by an applicant user, with an applicant accreditation verification software program that is configured to access an accreditation tracking and translation system, (ii) creating, by the applicant user, a new applicant profile, (iii) completing, by the applicant user, an application for the new applicant profile, (iv) creating a unique and universal code for the application, (v) requesting, by the applicant user, particular documents from documents sources for the application, (vi) referencing, by the applicant user, document sources in the application in connection with the particular documents, (vii) verifying the particular documents by the unique and universal code, and (viii) transferring the particular documents to the application after verification.

In some embodiments, the accreditation tracking and translation processes comprises a verified applicant accreditation process for a company to access and view verified accreditation of an applicant applying for a position with the company. In some embodiments, the verified applicant accreditation process comprises (i) interacting, by an agent of a company, with a company applicant-accreditation access software program to perform one of a first set of step and a second set of steps, (ii) determining whether to perform the first set of steps or the second set of steps, (iii) signing in with a unique number when the first set of steps is determined, (iv) accessing, in the first set of steps, a dashboard of the company applicant-accreditation access software program by the agent and performing an employer search through an employer search provided in the dashboard, (v) sending, in the first set of steps, a document access request to customer, (vi) receiving, by the company, an access request email when the second set of steps is determined, (vii) following, in the second set of steps, a link in the received access request email, (viii) signing in with the unique number, in the second set of steps, to a business portal, and (ix) performing one or more viewing options in the business portal including either or both of viewing academic records of the customer or viewing the customer's professional profile.

In some embodiments, the accreditation tracking and translation processes comprises a customer-initiated accreditation sharing process for sharing a customer's accreditation and/or professional profile with a school, an employer, or another institution. In some embodiments, the customer-initiated accreditation sharing process comprises (i) a customer signing in to optionally view a profile or access files, (ii) selecting files (transcripts or certificates) to perform a first set of file access steps or sharing a professional profile to perform a second set of profile sharing steps, (iii) choosing an optional service (print, translate, or equivalence services) in connection with the selected files in the first set of file access steps, (iv) sharing the selected files, in the first set of steps, with a school or an employer/institution, (v) selecting a country, (vi) selecting a city or province, (vii) selecting the school or employer/institution within the city/province of the country, (viii) sending the digitized transcript(s) and/or certificate(s) to the school or employer/institution to end the first set of file access steps, (ix) selecting a country in the second set of profile sharing step, (x) selecting an employer in the second set of profile sharing steps, and (xi) sending a professional profile access request to the employer to end the second set of profile sharing steps.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
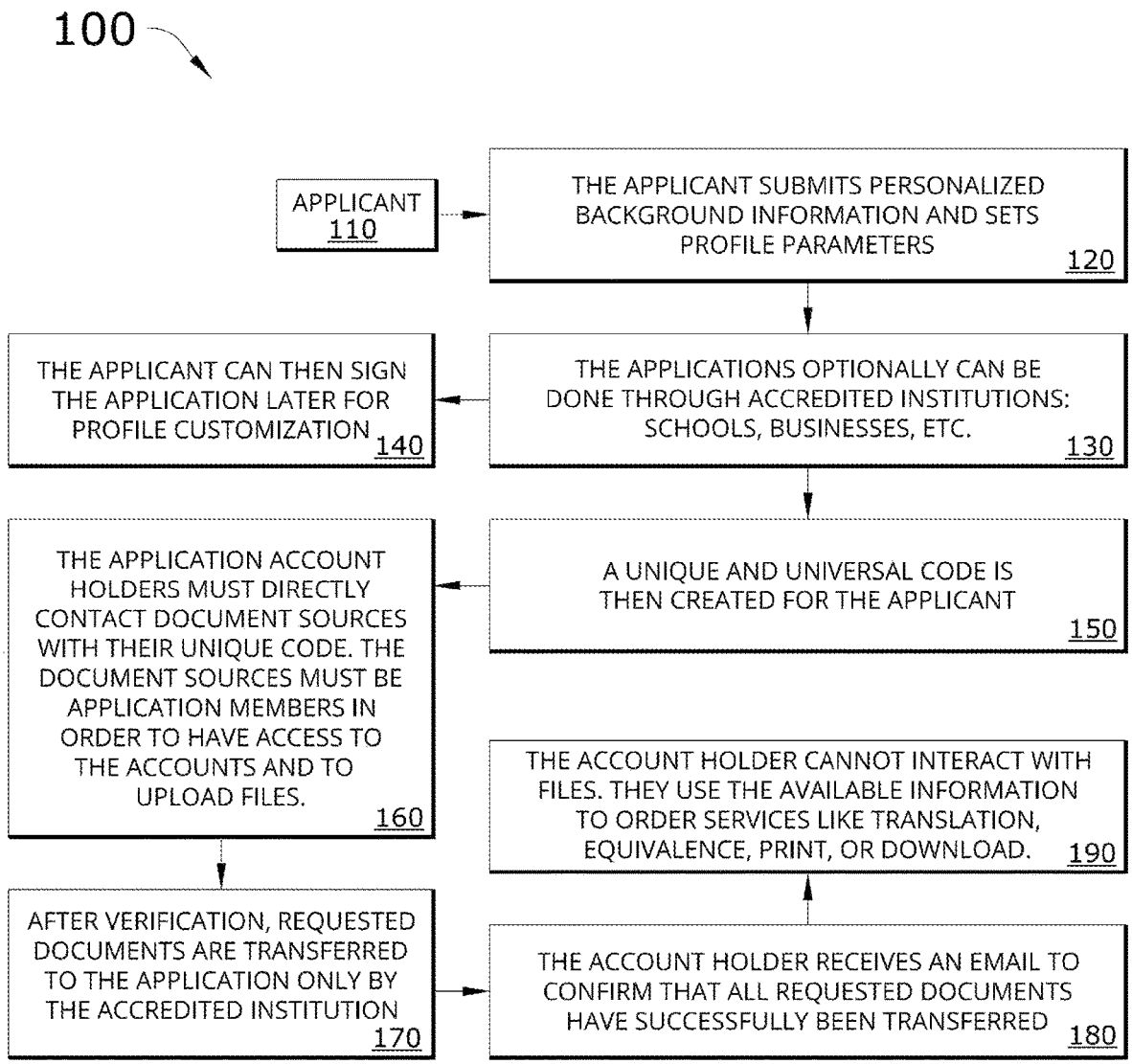
FIG. 1 conceptually illustrates an applicant-initiated accreditation request process for verifying accreditation of an applicant applying for a position with a company in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention provide an accreditation tracking and translation system and associated accreditation tracking and translation processes for tracking and translating educational, professional, and career-based accreditation. In some embodiments, the accreditation tracking and translation system and processes track and translate educational and career-based accreditation, such as school transcripts, certificates, degrees, attestations, etc. In some embodiments, the accreditation tracking and translation system and processes also make the tracked and translated accreditation easily accessible through any smartphone, tablet computing device, or computer. In some embodiments, the accreditation tracking and translation system and processes also keep all data records secure, trusted, and easily accessible, including the original data and the tracked and translated accreditation.

In some embodiments, the accreditation tracking and translation system and processes track and translate educational and career-based accreditation, such as school transcripts, certificates, degrees, attestations, etc. In some embodiments, the accreditation tracking and translation system and processes also make the tracked and translated accreditation easily accessible through any smartphone, tablet computing device, or computer. In some embodiments, the accreditation tracking and translation system and processes also keep all data records secure, trusted, and easily accessible, including the original data and the tracked and translated accreditation.

In some embodiments, the accreditation tracking and translation processes comprises an applicant-initiated accreditation request process for verifying accreditation of an applicant applying for a position with a company. In some embodiments, the applicant-initiated accreditation request process comprises (i) interacting, by an applicant user, with an applicant accreditation verification software program that is configured to access an accreditation tracking and translation system, (ii) creating, by the applicant user, a new applicant profile, (iii) completing, by the applicant user, an application for the new applicant profile, (iv) creating a unique and universal code for the application, (v) requesting, by the applicant user, particular documents from documents sources for the application, (vi) referencing, by the applicant user, document sources in the application in connection with the particular documents, (vii) verifying the particular documents by the unique and universal code, and (viii) transferring the particular documents to the application after verification.

In some embodiments, the accreditation tracking and translation processes comprises a verified applicant accreditation process for a company to access and view verified accreditation of an applicant applying for a position with the company. In some embodiments, the verified applicant accreditation process comprises (i) interacting, by an agent of a company, with a company applicant-accreditation access software program to perform one of a first set of step and a second set of steps, (ii) determining whether to perform the first set of steps or the second set of steps, (iii) signing in with a unique number when the first set of steps is determined, (iv) accessing, in the first set of steps, a dashboard of the company applicant-accreditation access software program by the agent and performing an employer search through an employer search provided in the dashboard, (v) sending, in the first set of steps, a document access request to customer, (vi) receiving, by the company, an access request email when the second set of steps is determined, (vii) following, in the second set of steps, a link in the received access request email, (viii) signing in with the unique number, in the second set of steps, to a business portal, and (ix) performing one or more viewing options in the business portal including either or both of viewing academic records of the customer or viewing the customer's professional profile.

In some embodiments, the accreditation tracking and translation processes comprises a customer-initiated accreditation sharing process for sharing a customer's accreditation and/or professional profile with a school, an employer, or another institution. In some embodiments, the customer-initiated accreditation sharing process comprises (i) a customer signing in to optionally view a profile or access files, (ii) selecting files (transcripts or certificates) to perform a first set of file access steps or sharing a professional profile to perform a second set of profile sharing steps, (iii) choosing an optional service (print, translate, or equivalence services) in connection with the selected files in the first set of file access steps, (iv) sharing the selected files, in the first set of steps, with a school or an employer/institution, (v) selecting a country, (vi) selecting a city or province, (vii) selecting the school or employer/institution within the city/province of the country, (viii) sending the digitized transcript(s) and/or certificate(s) to the school or employer/institution to end the first set of file access steps, (ix) selecting a country in the second set of profile sharing step, (x) selecting an employer in the second set of profile sharing steps, and (xi) sending a professional profile access request to the employer to end the second set of profile sharing steps.

As stated above, many people experience numerous difficulties finding and proving the authenticity of their educational and career-based accreditation. This is becoming more and more important due to growing number of international students and workers around the world. Unfortunately, this often results in the loss of considerable amounts of official recognition for various accomplishments, such as acquired school credits or the foreign accreditation (with in most countries easily translate into multiple years of school or training).

Systems in the past, as well as several existing systems currently, are limited to keeping these records within the institutions where they were first accredited. This makes them very hard to access in other countries. The problem is compounded by a language barrier. For example, in the United States it usually takes months to access school transcripts and career-based accreditation. Embodiments of the accreditation tracking and translation system and processes described in this specification solve such problems by providing every member with a unique number that allows them to quickly access all their educational and career-based accreditations in one safe and trusted platform.

Embodiments of the accreditation tracking and translation system and processes described in this specification differ from and improve upon currently existing options. In particular, the existing conventional accreditation systems were not created to track and translate professional and career-based records of users between languages and countries. By contrast, the accreditation tracking and translation system and software-implemented processes described in this specification are configured to track and translate educational and career-based accreditations of users all on one safe and trusted platform. Specifically, the accreditation tracking and translation system is designed for professional record retention, which saves both time and space. Furthermore, the accreditation tracking and translation system is configured to digitize all records, thereby making professional and educational credits paperless (entirely digital). This digitization process is automatic and enables hiring institutions to directly verify records within minutes. Examples of the educational and career-based accreditations that the accreditation tracking and translation system is configured to digitize include, without limitation, school transcripts, certificates, degrees, attestations, and the like. This makes such accreditations easily accessible through any smartphone, tablet computing device, computing device, or other electronic system. In short, the accreditation tracking and translation system keeps each user's records safe, trusted, digitized, readable in any language, and easily accessible.

The accreditation tracking and translation system and processes of the present disclosure may be comprised of the following elements. This list of possible constituent elements is intended to be exemplary only and it is not intended that this list be used to limit the accreditation tracking and translation system and processes of the present application to just these elements. Persons having ordinary skill in the art relevant to the present disclosure may understand there to be equivalent elements that may be substituted within the present disclosure without changing the essential function or operation of the accreditation tracking and translation system and processes.

1. A smart phone/tablet/or computer (digital device).
2. A web application to serve as interface and platform.
3. A unique number is only provided once to every new member.
4. Secure data base for records storing.
5. Access to internet.

The accreditation tracking and translation system and processes of the present disclosure generally works for schools and businesses. For schools, once the accreditation tracking and translation system is in place and everything is setup, students will need to determine, upon registration, whether or not they agree to allow their transcripts and academic records to be safely shared with the software. They will then be provided with a unique number that will never change. With this number, students can easily transfer their transcripts from one school to another as long as both schools have the application available in their system. It can be used for verification or authentication.

For businesses, it is possible to use the application to verify the authenticity of an applicant's certifications. Businesses and institutions can also use the application for the benefit of their employees. Career based accreditations can be uploaded directly into employees account through a special portal only accessible to accredited institutions and schools.

To make the accreditation tracking and translation system and processes of the present disclosure, a person would design, develop, and deploy an application capable of tracking and translating educational and career-based accreditations world-wide. By default, an account holder has the ability to access their listed accreditations. Language translation, attestation, or transcript equivalence are optional services available on the platform. This is to guaranty authenticity and legitimacy of the service. An improved capability will allow the software to promote users' skills and talents on career search engines and directly among registered businesses.

To use the accreditation tracking and translation system and processes of the present disclosure, individuals typically use a mobile device or other computing device. For instance, a user may operate a smartphone, a tablet computing device, or a computer to connect to and interact with the accreditation tracking and translation system. The mobile device and/or computing device operated by the user would normally be loaded with an application that includes a user interface for interaction. The user would log into an account through the application with the unique number provided to the member. Then, through the application, the user would be able to access, download, or send files. In some embodiments, the accreditation tracking and translation system and software-implemented processes are configured to prevent uploading from the individuals at this stage.

For businesses, usage of the accreditation tracking and translation system may differ from individual users. For instance, businesses access and use a special/business portal of the accreditation tracking and translation system. Furthermore, employers can verify applicant's information, for the purpose of ensuring that they are hiring the right candidates. Additionally, the accreditation tracking and translation system and software-implemented processes can also be used to record positive credits for employees.

Now, for other types of non-individual entities, schools and other such institutions may utilize the accreditation tracking and translation system in still other ways. For instance, schools and other institutions may be granted a special right to add contents to accounts, upon agreement. The software-implemented accreditation tracking and translation processes would be made available for schools and institutions.

By way of example, FIG. 1 conceptually illustrates an applicant-initiated accreditation request process for verifying accreditation of an applicant applying for a position with a company 100. The applicant-initiated accreditation request process for verifying accreditation of an applicant applying for a position with a company 100 may be performed in connection with an applicant interacting with a software program (referred to as the "applicant accreditation verification software program") that implements aspects of one or more of the accreditation tracking and translation processes.

As shown in this figure, the applicant-initiated accreditation request process for verifying accreditation of an applicant applying for a position with a company 100 is started by an applicant (at 110) interacting with the applicant accreditation verification software program. As the applicant interacts with the applicant accreditation verification software program, the applicant submits personalized background information and sets several profile parameters (at 120) for their new applicant profile. In normal practice, the applicant accreditation verification software program connects over a network to a cloud-based accreditation tracking and translation system that includes a cloud server that hosts a software-as-a-service ("SaaS") as an accreditation tracking and translation cloud application service. However, as an option, the application can be completed through accredited institutions (at 130) such as schools, businesses, etc. After submitting the personalized background information and setting profile parameters (at 120), the applicant may sign the application as a profile customization (at 140). A personal signature is obtained by an electronic e-signature system. The personal signature of the applicant would then be embedded within the application as an image (e-signature).

In some embodiments, after completing the preliminary background information and profile parameters, the application, and signature, the applicant-initiated accreditation request process for verifying accreditation of an applicant applying for a position with a company 100 moves forward to a step at which a unique and universal code is created by the application (at 150). This unique and universal code is essential for future references to the application and the applicant's personalized background information. Also, the applicant-initiated accreditation request process for verifying accreditation of an applicant applying for a position with a company 100 requires this unique/universal code for the application account holder to directly contact document sources (at 160). Furthermore, the applicant-initiated accreditation request process for verifying accreditation of an applicant applying for a position with a company 100 requires these document sources to be application members in order to have access to the accounts and to upload the requested files (at 160). Thus, the unique and universal code acts as verification of authenticity of the applicant and documents sources.

After verification, the applicant-initiated accreditation request process for verifying accreditation of an applicant applying for a position with a company 100 moves on to the next step at which the requested documents are transferred to the application (at 170) only by the accredited institution. After transferring the documents to the application, the applicant-initiated accreditation request process for verifying accreditation of an applicant applying for a position with a company 100 proceeds to a step at which the account holder receives an email to confirm that all requested documents have successfully been transferred (at 180). Notably, the applicant accreditation verification software program ensures that the account holder cannot interact with the files, as this would present a potential for altering documents, which would defeat the purpose of the system. Thus, the applicant-initiated accreditation request process for verifying accreditation of an applicant applying for a position with a company 100 may end or (optionally) proceed to other options in a final step at which the account holder may use the available information to order one or more services, such as translation, equivalence, printing, or downloading (at 190). Examples of these services are described below, by reference to FIG. 3.

While the applicant-initiated accreditation request process for verifying accreditation of an applicant applying for a position with a company 100 described by reference to FIG. 1 details an applicant-focused accreditation tracking and translation (software-implemented) process, another accreditation tracking and translation process is focused on company interactions, as is demonstrated in the next example.

Figure 2:
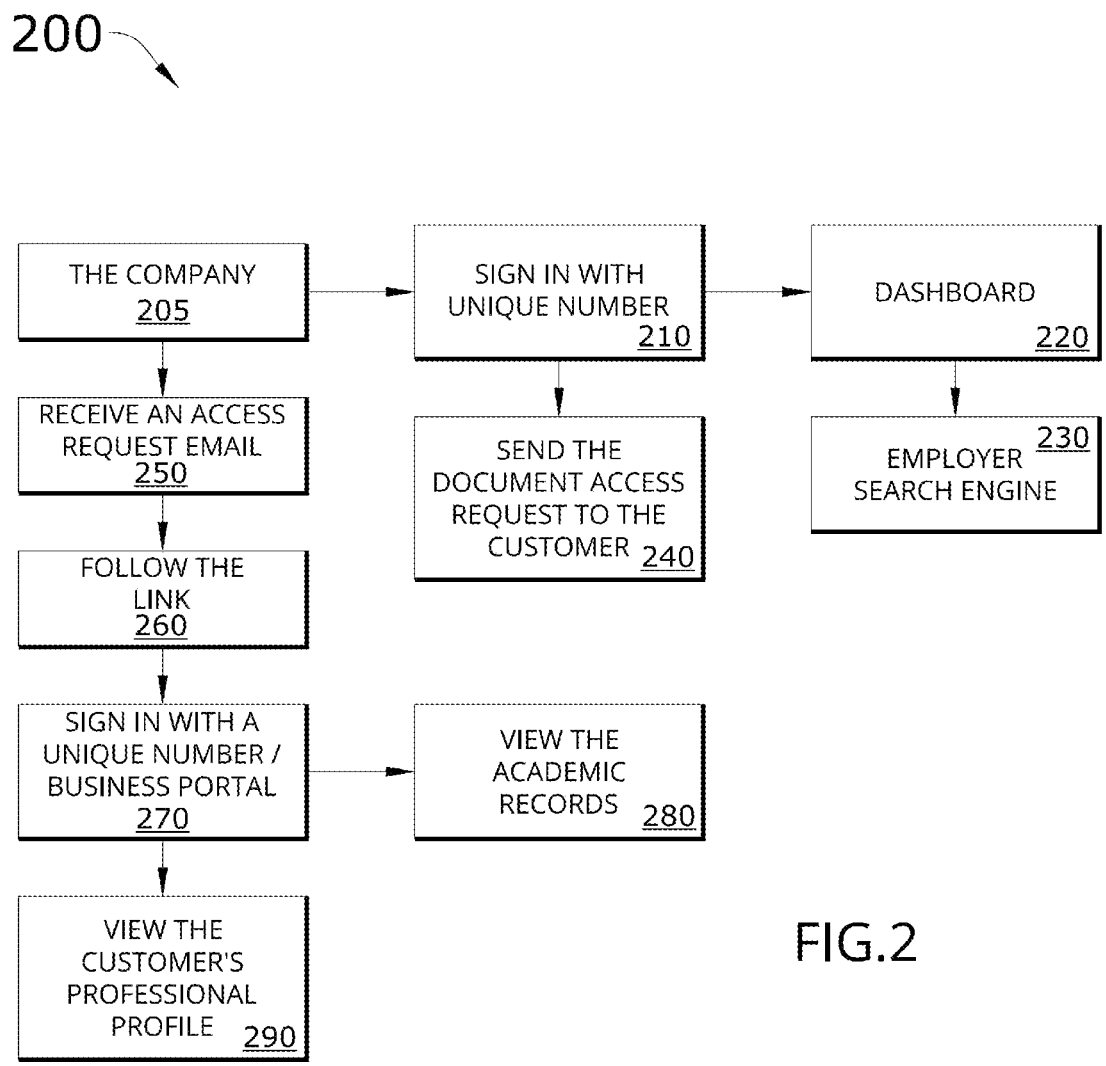
FIG. 2 conceptually illustrates a verified applicant accreditation process for a company to access and view verified accreditation of an applicant applying for a position with the company in some embodiments.

Specifically, FIG. 2 conceptually illustrates a verified applicant accreditation process for a company to access and view verified accreditation of an applicant applying for a position with the company 200. The applicant-initiated accreditation request process for verifying accreditation of an applicant applying for a position with a company 100 may be performed in connection with an agent of a company ("company user") interacting with a software application (referred to as the "company applicant-accreditation access software program") that implements aspects of one or more of the accreditation tracking and translation processes.

As shown in this figure, the verified applicant accreditation process for a company to access and view verified accreditation of an applicant applying for a position with the company 200 is started by a company (at 205) interacting with the company applicant-accreditation access software program. The "company" in this example may be an employee, a contractor, or any other agent of the company. This initial interaction of the company with the company applicant-accreditation access software program presents alternative paths of steps for the agent to pursue.

Specifically, along a first path, the verified applicant accreditation process for a company to access and view verified accreditation of an applicant applying for a position with the company 200 starts with a step at which the agent for the company signs in with a unique number (at 210). The verified applicant accreditation process for a company to access and view verified accreditation of an applicant applying for a position with the company 200 allows the agent to view a dashboard (at 220) or send a document access request to a customer (at 240). When the agent for the company accesses the dashboard (at 220), the verified applicant accreditation process for a company to access and view verified accreditation of an applicant applying for a position with the company 200 provides a step at which the agent may engage with an employer search engine (at 230) to search for a particular employer. Sometimes, the agent for the company may search for the particular employer via the employer search engine (at 230) accessed through the dashboard (at 220) and, upon identifying the particular employer, request the employer to share profile information. This may allow the agent for the company to obtain the relevant information to second the document access request to the customer (at 240).

By contrast, the second path of steps involves receiving an access request email (at 250), following a link in the access request email (at 260), and signing in to a business portal accessible to the company with the unique number (at 270). Once in the business portal, the agent for the company may view academic records (at 280) or view the customer's professional profile (at 290). This, of course, presumes that the document access request sent to the customer (at 240) was accepted/approved by the customer.

Figure 3:
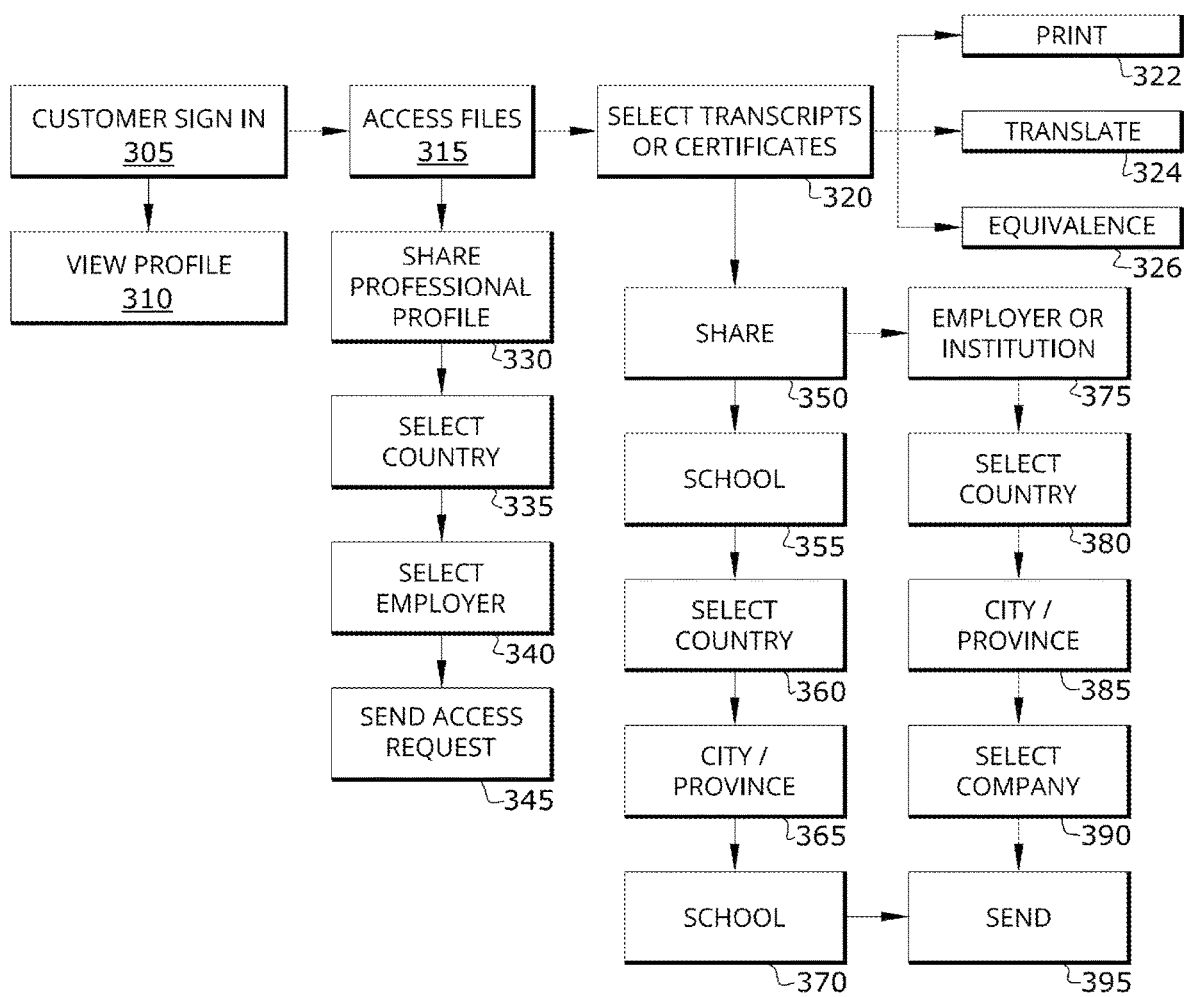
FIG. 3 conceptually illustrates a customer-initiated accreditation sharing process for sharing a customer's accreditation and/or professional profile with a school, an employer, or another institution in some embodiments.

Turning to another example, FIG. 3 conceptually illustrates a customer-initiated accreditation sharing process 300 for sharing a customer's accreditation and/or professional profile with a school, an employer, or another institution. The customer-initiated accreditation sharing process 300 for sharing a customer's accreditation and/or professional profile with a school, an employer, or another institution may be performed in connection with a customer (or "user") interacting with a software application (referred to as the "customer accreditation sharing software program") that implements aspects of one or more of the accreditation tracking and translation processes.

As shown in this figure, the customer-initiated accreditation sharing process 300 is started by a customer (at 305) interacting with the customer accreditation sharing software program. As an initial option, the customer can either view their profile (at 310) or access files (at 315). The customer may skip ahead to accessing files (at 315) without viewing their profile (at 310). Alternatively, when the customer chooses to view their profile (at 310), it is possible to make changes to the basic information or just view for confirmation purposes. Then the customer can then move on to accessing files (at 315).

When accessing files (at 315), the customer accreditation sharing software program of some embodiments provides options for either selecting files (at 320), typically transcripts or certificates that have been previously uploaded by the customer, or sharing their professional profile (at 330). When selecting files (at 320), the customer interacts with the customer accreditation sharing software program to select a particular transcript or certificate (or other accreditation file). Upon making the selection of the particular file, the customer accreditation sharing software program enables several user interface tools that provide payable options for the customer to pursue. The options include printing (at 322) the customer-selected transcript or certificate, translating (at 324) the customer-selected transcript or certificate, and performing an equivalence (at 326) operation for content in the customer-selected transcript or certificate. In some embodiments, the customer accreditation sharing software program implements a payment gateway through which the customer can pay for the services selected and rendered. In some other embodiments, the customer accreditation sharing software program accesses a third party (external) payment gateway to process payments from the customer (and all other customers) for the selected services.

Turning back to the step for accessing files (at 315), after the customer selects this option in the customer accreditation sharing software program, the customer-initiated accreditation sharing process 300 proceeds through a sequence of steps that includes sharing a professional profile (at 330), selecting a country (at 335), selecting an employer (at 340) in the country, and sending an access request (at 345) to the employer to share the professional profile. For example, a customer may be interested in a professional profile of a person who is employed by a particular employer and, therefore, seeks to send a request to the employer.

Beyond the customer options provided in the customer accreditation sharing software program after selecting transcripts or certificates (at 320), the customer-initiated accreditation sharing process 300 provides another path through different sequences of steps. Specifically, the other path is a transcript/certificate sharing path (at 350) that allows the customer to share the selected transcript(s) or certificate(s) with a school (at 355) which involves a first sequence of steps, or sharing the same with an employer or institution (at 375) which involves a second sequence of steps.

Referring to the first sequence of steps for sharing (at 350) the selected transcript(s) and/or certificate(s) with a school (at 355). The steps of the customer-initiated accreditation sharing process 300 down this first sequence includes selecting a country (at 360) in which a school of interest exists or simply a country of interest to the customer, selecting a city/province (at 365) of that country in which the school of interest exists, and selecting a particular school (at 370) in the city/province in the country. Then the customer-initiated accreditation sharing process 300 completes the first sequence of steps for sharing (at 350) the selected transcript(s) and/or certificate(s) with the particular school (at 370) by electronically sending (or transmitting) the digitized selected transcript(s) and/or certificate(s) to the particular school (at 395).

Now, turning to the second sequence of steps for sharing (at 350) the selected transcript(s) and/or certificate(s) with an employer or institution (at 375). The steps of the customer-initiated accreditation sharing process 300 down this second sequence includes selecting a country (at 380) of interest, selecting a city/province (at 385) of interest, and selecting a particular company (at 390) in the city/province in the country. Then the customer-initiated accreditation sharing process 300 completes the second sequence of steps for sharing (at 350) the selected transcript(s) and/or certificate(s) with the particular company (at 390) by electronically sending (or transmitting) the digitized selected transcript(s) and/or certificate(s) to the particular company (at 395). Then the customer-initiated accreditation sharing process 300 ends.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. For instance, the accreditation tracking and translation system and software-implemented processes can be adapted to operate solely for translation and accreditation equivalence services.

Also, in this specification, the terms "software" and "software-implemented processes" are meant to include similar "programs", "applications", "modules", "services", "software services", and the like, wherever installed or stored. This includes firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
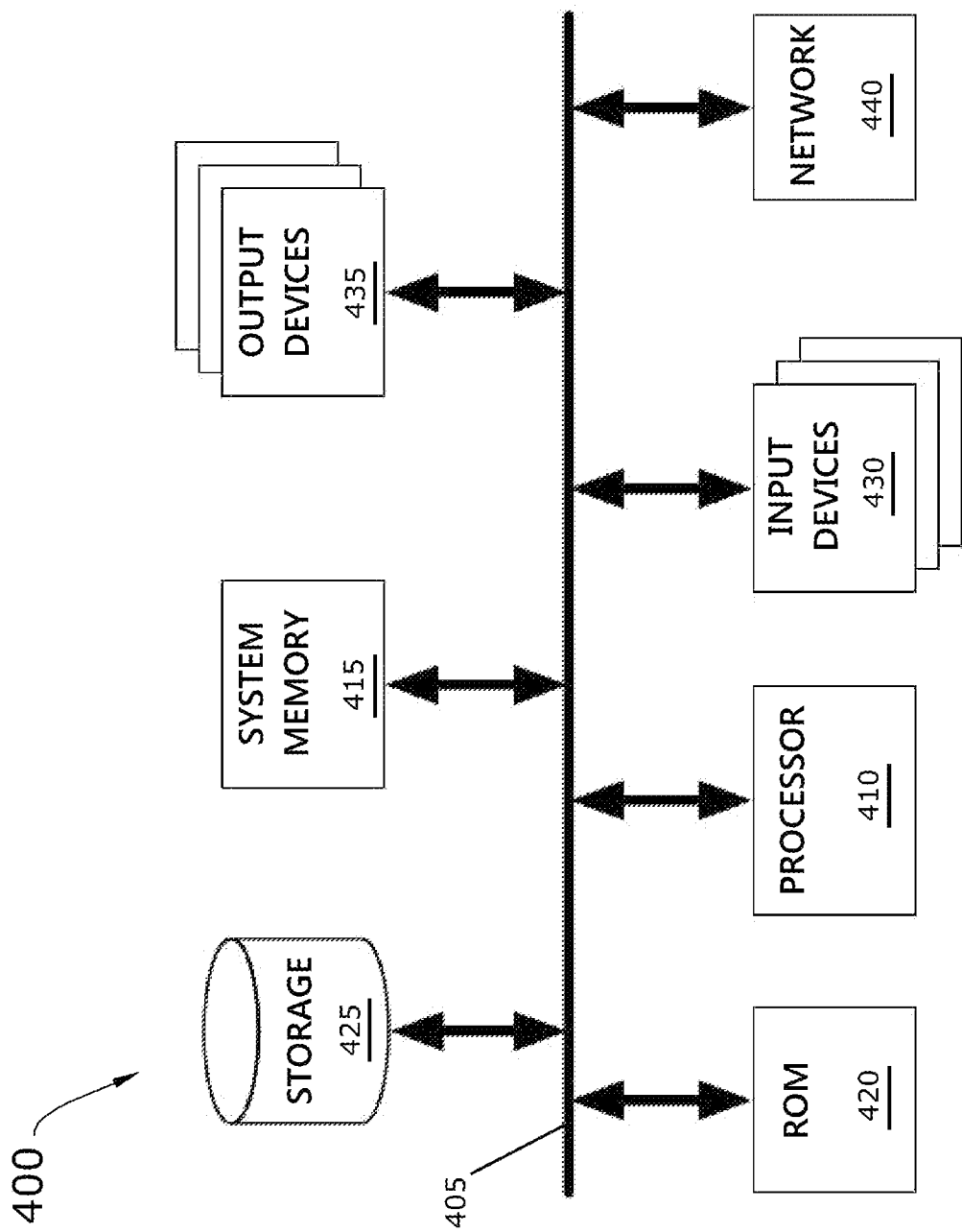
FIG. 4 conceptually illustrates an electronic system with which some embodiments of the invention are implemented.

By way of example, FIG. 4 conceptually illustrates an electronic system 400 with which some embodiments of the invention are implemented. The electronic system 400 may be a computer, such as a desktop computer, a personal computer ("PC"), a single board computer ("SBC"), or a laptop computer, or may be a mobile computing device, such as a smartphone, a personal digital assistant ("PDA") handheld device, a tablet computing device, or any other sort of mobile (or non-mobile) electronic device. Such an electronic system includes various types of computer readable media and interfaces for various other types of computer readable media. The electronic system 400 shown in this figure includes a bus 405, processing unit(s) 410, a system memory 415, a read-only memory 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425. From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only memory 420. For example, the various memory units include instructions for performing translations to other languages or generating unique applicant codes to apply to all the applicant's uploaded accreditation documentation. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display images generated by the electronic system 400. The output devices 435 include printers and display devices, such as liquid crystal displays ("LCD") and organic light emitting diode ("OLED") displays. Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), a network of networks (such as the Internet), a cloud compute environment (such as a software-as-a-service ("SaaS") cloud application service hosted on a cloud server with suitable networking hardware devices. Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-3 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or all of the processes could be implemented together as part of a larger macro process in a software implementation. Thus, one of ordinary skill in the art would understand that the invention is not to be limited by the foregoing illustrative details, but rather is to be defined by the appended claims.

I claim:

1. An applicant-initiated accreditation request process comprising:

starting an applicant accreditation verification software program on a computing device operable by an applicant user;

accessing, by the applicant accreditation verification software started on the computing device operable by the applicant user, an accreditation tracking and translation cloud application service hosted by a cloud server of a cloud-based accreditation tracking and translation system, wherein the accreditation tracking and translation cloud application service is accessible to one or more application members;

interacting, by the applicant user, with the applicant accreditation verification software program after access to the accreditation tracking and translation cloud application service is established;

creating, by the applicant user, a new applicant profile with personalized background information about the applicant user;

creating a unique and universal code for an applicant user account associated exclusively with the applicant user;

completing, by the applicant user, an application for the new applicant profile;

applying the unique and universal code created for the applicant user account to the application;

referencing, in the application by the applicant user, a plurality of document sources and a plurality of documents associated with the plurality of document sources;

verifying that the plurality of documents referenced by the applicant user in the application are documents for the applicant user by matching the unique and universal code applied to the application;

initiating a request, by the applicant user, for particular documents from a particular document source in the plurality of document sources, wherein the applicant user initiates the request via direct contact with the particular document source through the applicant accreditation verification software program;

automatically verifying, by the applicant accreditation verification software program, whether the particular document source is an application member of the one or more of application members and has access to the accreditation tracking and translation cloud application service and is permitted to upload files to the applicant user account;

automatically providing, by the applicant accreditation verification software program, the unique and universal code and the request for particular documents to the particular document source upon verifying that the particular document source is a particular application member as a first accredited institution of the particular documents; and transferring, by the particular document source as the first accredited institution, the particular documents to the application via the accreditation tracking and translation cloud application service.

2. The applicant-initiated accreditation request process of claim 1, wherein creating the new applicant profile comprises entering and submitting the personalized background information, wherein the applicant accreditation verification software program automatically stores the personalized background information in a secure data base, wherein the applicant user is only permitted access to the personalized background information by applying the unique and universal code.

3. The applicant-initiated accreditation request process of claim 2, wherein creating the new applicant profile further comprises setting a plurality of profile parameters for the new applicant profile.

4. The applicant-initiated accreditation request process of claim 1, wherein the applicant accreditation verification software program is configured to connect over a network to access the accreditation tracking and translation cloud application service hosted by the cloud server of the cloud-based accreditation tracking and translation system.

5. The applicant-initiated accreditation request process of claim 1, wherein completing the application comprises completing the application through a second accredited institution.

6. The applicant-initiated accreditation request process of claim 5, wherein the first accredited institution comprises a first school and the second accredited institution comprises a second school.

7. The applicant-initiated accreditation request process of claim 5, wherein the first accredited institution comprises a school and the second accredited institution comprises a business.

8. The applicant-initiated accreditation request process of claim 1 further comprising electronically signing, by the applicant user, the application after completing the application.

9. The applicant-initiated accreditation request process of claim 5, wherein the unique and universal code is required for the second accredited institution to directly contact the plurality of document sources referenced by the applicant user in the application.

10. The applicant-initiated accreditation request process of claim 9, wherein the plurality of document sources referenced by the applicant user in the application comprises a particular institution with a particular application member account with a particular code that is different from the unique and universal code of the applicant user account.

11. The applicant-initiated accreditation request process of claim 1 further comprising ordering a service for a specific document selected from the particular documents.

12. The applicant-initiated accreditation request process of claim 11, wherein the service ordered comprises a translation service that is configured to provide a language translation for content in the specific document from a first language to a second language.

13. The applicant-initiated accreditation request process of claim 11, wherein the service ordered comprises an equivalence service that is configured to perform an equivalence evaluation to equate graded content in the specific document from a first grading system in a first country to a second grading system in a second country.

14. The applicant-initiated accreditation request process of claim 11, wherein the service ordered comprises a print service that is configured to print the specific document.

15. The applicant-initiated accreditation request process of claim 10, wherein transferring the particular documents to the application comprises verifying authenticity of the particular documents by confirming that the particular institution is a member associated with the particular application member account by the particular code.

16. The applicant-initiated accreditation request process of claim 1, wherein transferring the particular documents to the application comprises verifying authenticity of the particular documents by confirming that the first accredited institution is the particular application member with a first accredited institution member account associated with a unique first accredited institution member code.

* * * * *